Jan. 30, 1962  P. C. KEITH  3,018,632
CYCLIC PROCESS FOR TRANSPORTING METHANE
Filed May 11, 1959
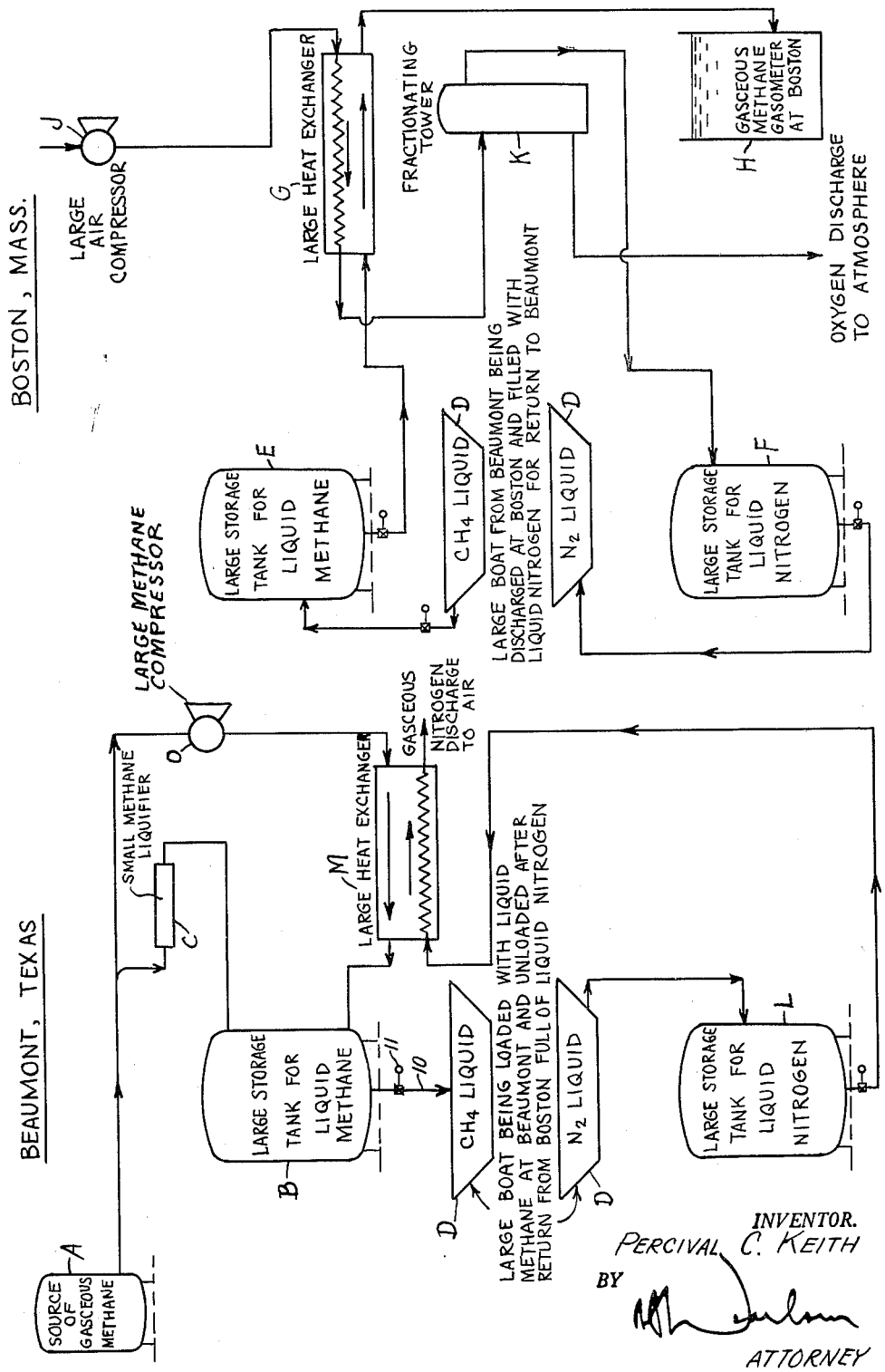
INVENTOR.
PERCIVAL C. KEITH
BY
ATTORNEY

United States Patent Office 3,018,632
Patented Jan. 30, 1962

3,018,632
CYCLIC PROCESS FOR TRANSPORTING METHANE
Percival C. Keith, Peapack, N.J., assignor to Hydrocarbon Research, Inc., New York, N.Y., a corporation of New Jersey
Filed May 11, 1959, Ser. No. 812,495
1 Claim. (Cl. 62—9)

This invention pertains to the production and transportation of methane or like gaseous hydrocarbon material from a source point near a natural gas field to a distant point of use where fluctuating demand and peak loads make it difficult and expensive to maintain an adequate supply.

Pipe line transportation of gaseous products, such as methane and natural gas, is well known and for many years has been handicapped by the high cost of maintaining adequate storage at the point of use. It has heretofore been proposed to liquefy the methane or like hydrocarbon gas at the point of use and maintain suitable storage facilities for the liquid product, which may be drawn upon for supplying peak loads and the like, the excess gaseous methane being liquefied during periods when the surplus gas is being delivered through the pipe line. This is too costly and has not been adopted for economic reasons. The cost of installing and maintaining compressors and refrigeration equipment adequate to liquefy methane or natural gas is high. Moreover, the cost of gasifying the liquid methane to make it suitable for use for industrial and household fuel and the like is very expensive.

More recently it has been proposed to liquefy methane at a point near the source of natural gas, for example, and to transport the liquid methane in tankers which are insulated to reduce the loss of cold and curtail loss by gasification while in transport to the place of use. This procedure does not avoid the high cost of liquefaction at the source nor of gasification of the liquid methane or liquefied gas at the place of use.

According to this invention, a series of steps is employed in a cyclic system which drastically reduces the cost above referred to and results in a highly economical operation. For convenience and for purposes of illustration, I shall refer to the source of gaseous methane or natural gas as Beaumont, Texas, and the point of use as Boston, Massachusetts.

Referring to the drawing, the single figure is a schematic diagram illustrating one embodiment of this invention in which the principal elements with accompanying designations make the operation readily understandable.

Adequate gas storage is illustrated by tank A at Beaumont, which would normally be supplied by connections, not shown, to adjacent refineries or to available pipe lines. A large heat insulated storage tank B, which for example may have a capacity of 50,000 to 100,000 barrels of liquid methane, may be located conveniently near a Beaumont dock, not shown. A small liquefier C, which is composed of the usual compressor and refrigeration equipment, is used to fill tank B with liquid methane in order to initiate the cyclic operation. This liquefier may be small and inexpensive, because it may take a relatively long time—for example, from one to three months—to fill tank B, and thus its daily capacity to produce liquid methane may be less than five percent of the capacity of tank B.

As hereinafter explained, the small liquefier C would continue to perform a useful and important function as a make-up unit to compensate for losses when the cyclic operation is continuing normally.

A large capacity tanker D is heat insulated and equipped to transport liquid methane from Beaumont to the point of use at Boston.

A fleet of tank trucks or a train of tank cars may, under some conditions, be found desirable as a substitute for the tanker D which is sometimes hereinafter referred to as a heat insulated transport vehicle.

It should be noted that heat insulation is for the purpose of preventing loss of cold and premature gasification of the liquid methane being transported. Therefore, auxiliary refrigeration may be included with, or substituted for, insulating substances, or a "Thermos bottle" type of construction may be used.

The tanker D is filled with liquid methane from storage tank B by pipe line 10 having a suitable pump 11.

The tanker D then proceeds to its destination at Boston and discharges its cargo of liquid methane into large storage tank E, which corresponds to the tank B but may be much larger, if desirable, for the purpose of taking care of fluctuations in demand at the point of use. In making reference to methane, it is not intended as a limitation and any suitable hydrocarbon gas may be transported. When the tanker D has discharged its cargo of liquid methane into the tank E at Boston, it is refilled with liquid nitrogen from a large tank F.

The liquid nitrogen, designated $N_2$, is produced in a highly economical manner by heat exchange with the liquid methane which is drawn from the tank E through heat exchanger G. Concurrently, as the liquid methane gives up its heat to produce liquid nitrogen, it is gasified without the large fuel expense normally involved in this operation. The gaseous methane is discharged into a gasometer H or other suitable storage in Boston, from which it is distributed to industrial and household users.

The production of liquid $N_2$ employs the usual air compressor J and fractionating tower K, but this equipment is much simpler and less costly because of the enormous quantities of cold given up in the heat exchange by the liquid methane.

The tanker D returns to Beaumont and discharges its cold liquid $N_2$ cargo into a large tank L. The tanker is then refilled with liquid methane from tank B.

The liquid $N_2$ as it is drawn from the tanker D passes through a large heat exchanger M for the purpose of liquefying large additional quantities of gaseous methane. The liquefaction of the gaseous methane may involve the use of a large capacity compressor O, but this operation is low in cost because of the enormous quantities of cold given up by the liquid $N_2$ in exchanger M. Moreover, this compressor O may be unnecessary if the gas, as produced at the well or as delivered to and maintained in the tank A, is at high pressure. The gaseous nitrogen may be employed for any suitable purpose or discharged into the atmosphere.

The cycle is repeated indefinitely, and due to some unavoidable loss of cold, the small make-up liquefier C is operated part time or full time as a make-up unit to add to the liquid methane in tank B.

It will, of course, be understood that while the cycle is described as employing a single tanker plying back and forth between Beaumont and Boston, a large number of tankers may be utilized depending on the capacity of the storage tank and equipment and the requirements at Boston.

If an expensive tanker adapted to transport liquid methane or a like material is usefully employed only in one direction and returns in ballast with its tanks filled with sea water, the entire internal structure of the tanker would have a very wide variation in temperature between the extremely low temperature when the tanks are full of liquid methane and the relatively high temperature when they are filled with sea water on the return.

The cycle of this invention avoids this loss of cold and makes it unnecessary to clean the tanks at the turn-around point, because the temperature of the liquid methane and that of the liquid nitrogen are comparable. The cyclic operation of this invention is believed to be highly economical and, under many conditions, may completely substitute for other means of transportation. For example, it would not be feasible to run a pipe line across the Atlantic like the Atlantic cables, but it would be entirely feasible to use the cycle of this invention to supply fuel gas from Beaumont to London, for example.

This cyclic process has a distinct economy in that it is so largely self-sustaining that only the small stand-by liquefying unit C for the methane is required at the point of origin. This unit normally would have not more than five percent of the capacity of the tank B.

It may be desirable in some cases to liquefy air at the point of use by heat exchange, as above explained, and to control the fractionation so as to produce both liquid $N_2$, for transportation in the tanker on the return trip, and also $O_2$ for sale or use in chemical processes.

It will be understood by those skilled in this art that the process steps may be varied, and the utilization of the products at the point of use may vary without departing from the spirit of the invention. Consequently, only such limitations should be imposed as are indicated in the appended claim.

What I claim is:

A cyclic process for producing and liquefying methane at a source near the point of production and delivering and gasifying the methane at a distant point of use, which comprises the following steps: initially accumulating a large quantity of liquid methane at the point of origin by using a relatively small make-up liquefier for an extended time, transferring a large quantity of the liquid methane so accumulated to an insulated transport vehicle, transporting said vehicle to the distant point of use, discharging the liquid methane from the transport vehicle at the point of use, liquefying a large quantity of air by compression and by heat exchange with the liquid methane from said transport vehicle at the point of use, making the resulting gaseous methane available for current use, fractionating the liquid air from said heat exchange and transferring the liquid nitrogen to said transport vehicle and back to the point of origin, liquefying large quantities of methane independently of said small make-up liquefier and in parallel therewith by compression and by heat exchange with liquid nitrogen drawn from the transport vehicle at the point of origin to complete the cycle and continuing to use the small make-up liquefier in its independent capacity to compensate for cold lost in transit.

References Cited in the file of this patent

UNITED STATES PATENTS

| | | |
|---|---|---|
| 2,328,647 | Jackson | Sept. 7, 1943 |
| 2,903,860 | Brown | Sept. 15, 1959 |
| 2,909,906 | Bacquet et al. | Oct. 27, 1959 |
| 2,975,604 | McMahon | Mar. 21, 1961 |

FOREIGN PATENTS

| | | |
|---|---|---|
| 736,736 | France | Sept. 26, 1932 |
| 1,036,884 | Germany | Aug. 21, 1958 |
| 1,053,011 | Germany | Mar. 19, 1959 |